No. 633,498. Patented Sept. 19, 1899.
R. F. BARKER.
SAWMILL SET WORKS.
(Application filed May 11, 1899.)
(No Model.) 3 Sheets—Sheet 1.
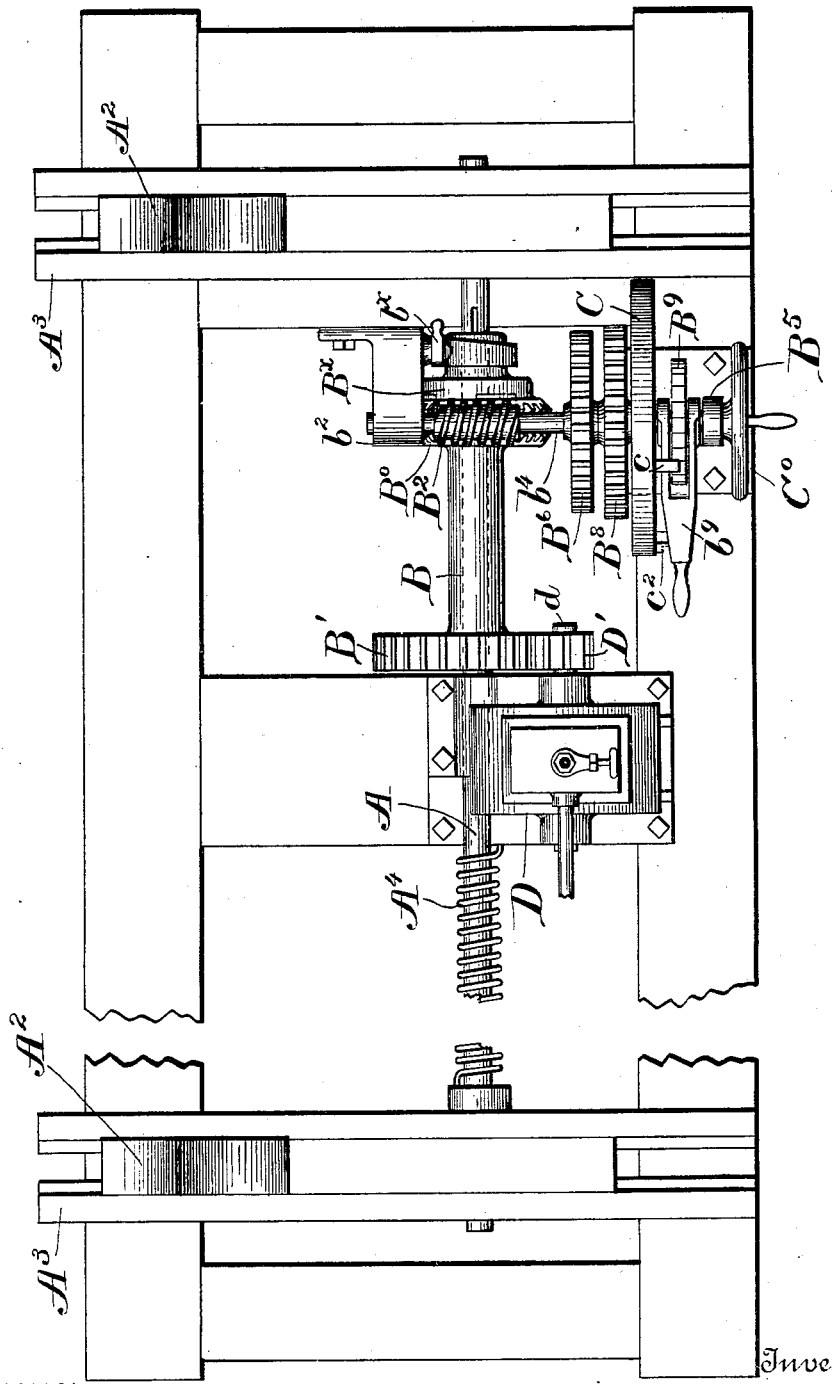

No. 633,498. Patented Sept. 19, 1899.
R. F. BARKER.
SAWMILL SET WORKS.
(Application filed May 11, 1899.)
(No Model.) 3 Sheets—Sheet 2.
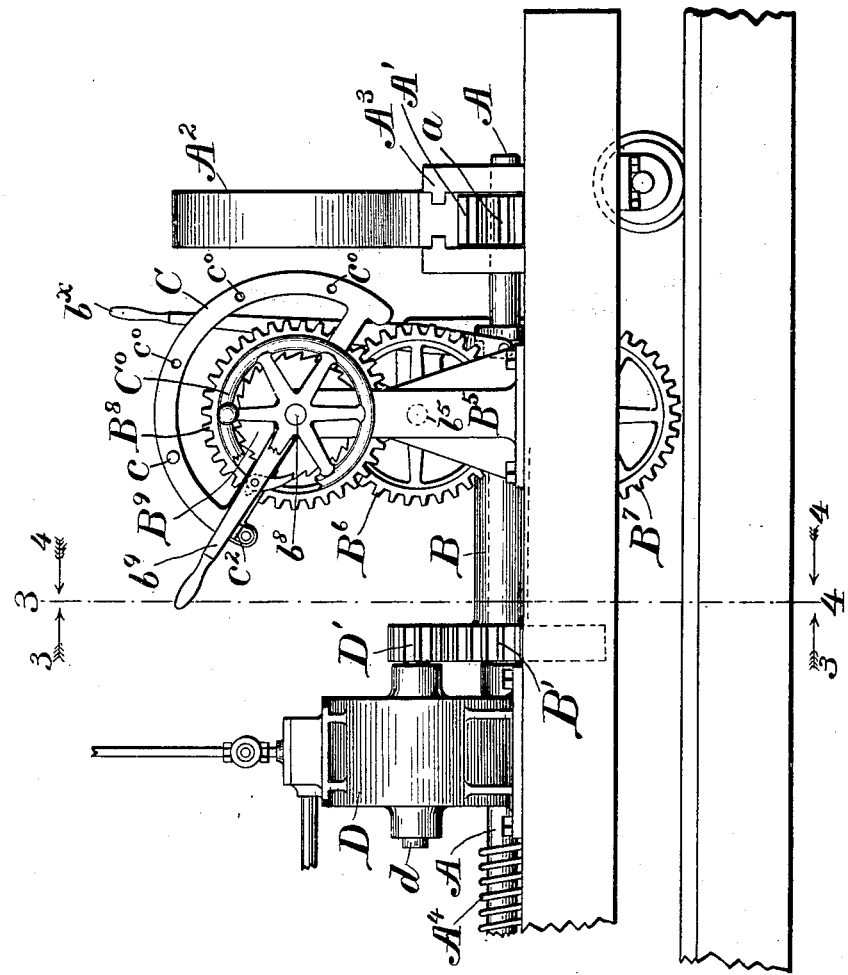
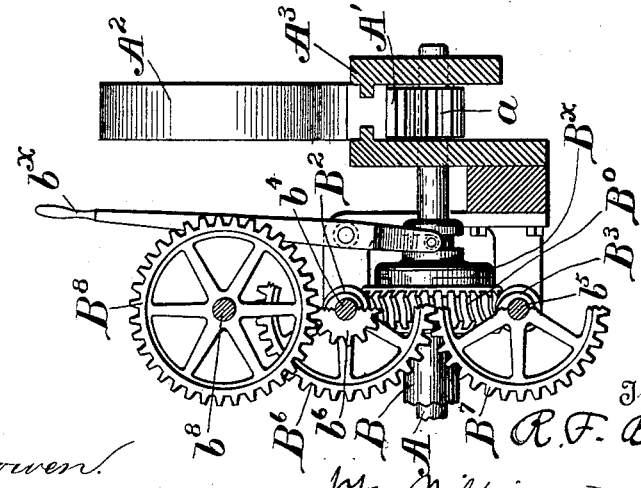
Witnesses
Percy C. Bowen
Clarence A. Bateman
Inventor
R. F. Barker,
by Wilkinson & Fisher,
Attorneys.
THE NORRIS PETERS CO., PHOTO-LITHO., WASHINGTON, D. C.

No. 633,498. Patented Sept. 19, 1899.
R. F. BARKER.
SAWMILL SET WORKS.
Application filed May 11, 1899.
(No Model.) 3 Sheets—Sheet 3.
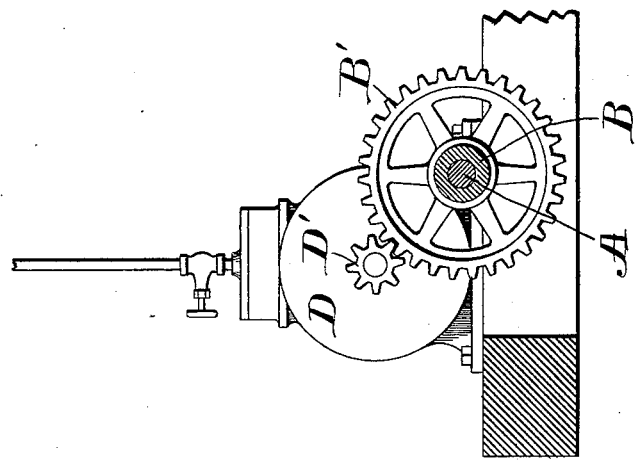
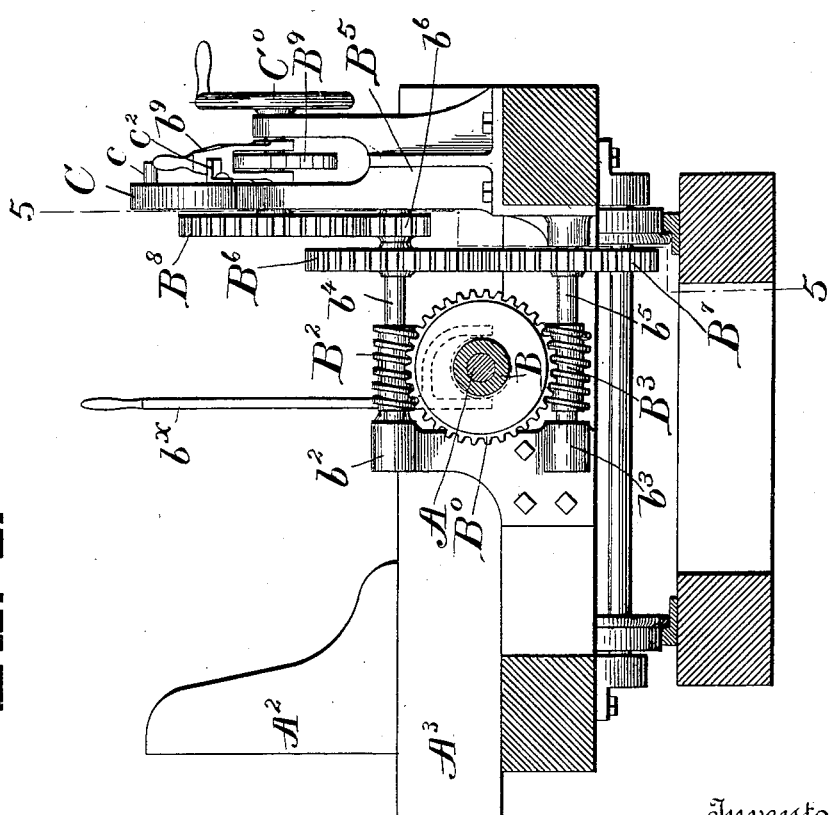
Witnesses
Percy C. Bowen
Clarence A. Bates
Inventor
R. F. Barker,
by Wilkinson & Fisher,
Attorneys.

UNITED STATES PATENT OFFICE.

RUBEN F. BARKER, OF MARINETTE, WISCONSIN, ASSIGNOR OF ONE-HALF TO MICHAEL CORRY, OF MENEKAUNE, WISCONSIN.

SAWMILL SET-WORKS.

SPECIFICATION forming part of Letters Patent No. 633,498, dated September 19, 1899.

Application filed May 11, 1899. Serial No. 716,413. (No model.)

*To all whom it may concern:*

Be it known that I, RUBEN F. BARKER, a citizen of the United States, residing at Marinette, in the county of Marinette and State of Wisconsin, have invented certain new and useful Improvements in Sawmill Set-Works; and I do hereby declare the following to be a full, clear, and exact description of the invention, such as will enable others skilled in the art to which it appertains to make and use the same.

My invention relates to improvements in sawmill set-works, and has for its object to provide means whereby a constant tendency may be exerted upon the set-shaft to advance the knees, which tendency is retarded and regulated by means of suitable mechanism, hereinafter described and claimed.

My invention will be understood by reference to the accompanying drawings, wherein the same parts are indicated by the same letters throughout the several views.

Figure 1 represents a top plan view of my invention. Fig. 2 represents a rear elevation of the same, part of the carriage being broken away. Fig. 3 is a section taken on the line 3 4 in Fig. 2 and looking in the direction of the arrows 3 in said figure. Fig. 4 is a section taken on the line 3 4 of Fig. 2 and looking in the direction of the arrows 4 in said figure, and Fig. 5 is a section taken on the line 5 5 in Fig. 3 and looking to the left.

A represents the set-shaft, provided with pinions, only one of which is seen at $a$ in Figs. 2 and 5, which engage the usual toothed racks A' upon the knees $A^2$ for moving the latter along the head-blocks $A^3$. The said shaft may be fitted with a spring $A^4$, if desired.

B represents a sleeve mounted loosely upon the set-shaft and having either as integral parts thereof or rigidly mounted thereon toothed gear B' and a worm-wheel $B^0$. A clutch $B^\times$, keyed upon the set-shaft A and operated through a pivoted lever $b^\times$, is arranged to engage with a clutch-face upon the side of the worm-wheel $B^0$ for locking the sleeve B and its integral parts upon the set-shaft.

$B^2$ and $B^3$ represent two worms rigidly mounted in brackets $b^2$ and $b^3$ at one end and having their shafts $b^4$ and $b^5$ also journaled in bearings upon the upright $B^5$. These worms mesh at all times with the worm-wheel $B^0$ upon opposite sides thereof, and upon the shafts $b^4$ and $b^5$, respectively, are rigidly mounted toothed gears $B^6$ and $B^7$, meshing with each other, and pinion $b^6$, mounted upon the shaft $b^4$, meshes with a toothed gear $B^8$, mounted upon the shaft $b^8$, journaled in the upright $B^5$. In the bifurcated upper portion of this upright $B^5$ a ratchet-wheel $B^9$ is rigidly mounted upon the shaft $b^8$, and a pawl-carrying rocking arm $b^9$ straddles the said ratchet-wheel and has its pawl arranged to engage the teeth of the said ratchet-wheel. A segmental bar C is rigidly mounted upon the upright $B^5$ and provided with a plurality of pin-holes $c^0$ to receive adjustable pins $c$, which constitute stops for regulating the throw of the arm $b^9$. A rigid stop $c^2$ is provided at one end of the segmental bar C, against which the arm $b^9$ engages when at rest. The shaft $b^8$, carrying the toothed gear $B^8$, is given a partial rotation by swinging the arm $b^9$ first over to the right in Fig. 2 and then to the left again, during which latter movement the pawl carried thereby engages with the ratchet-teeth upon the wheel $B^9$, causing the rotation of the latter. Through the toothed gear $B^8$ the pinion $b^6$ on the shaft $b^4$ and also the intermeshing gears $B^6$ and $B^7$ upon the shafts $b^4$ and $b^5$, respectively, are rotated, causing the worms $B^2$ and $B^3$ to rotate correspondingly and the worm-wheel $B^0$ and the set-shaft A to turn, the pinions $a$ upon the latter meshing with the racks A' upon the knees, causing the knees to advance the desired distance. A hand-wheel $C^0$ is mounted upon the shaft $b^8$ for convenience in rotating the shaft more rapidly than this can be done by means of the arms $b^9$, when desired. The constant tendency of the set-shaft to rotate is effected by the following means:

A rotary engine D, of any suitable construction, is mounted upon the frame of the carriage and has a pinion D' mounted upon its shaft $d$, the said pinion meshing with the toothed gear B' upon the sleeve B, mounted upon the set-shaft, as hereinbefore described. Steam or other pressure being turned onto the rotary engine D, the pinion D', and through it the gear B' and the worm B⁰, would be rotated were it not that the said worm-wheel is locked by means of the worms B² and B³, engaging therewith. Pressure being kept on the engine during the operation of the carriage, there is a constant tendency of the set-shaft when the clutch thereon is locked with the worm-wheel to rotate, and it is this tendency of the set-shaft to rotate under the pressure from the engine that is utilized for setting up the knees. This setting up is regulated, however, by the ratchet-arm $b^9$, through which the train of gears for rotating the worms B² and B³ is actuated. The adjustable pin $c$ being set to gage the desired thickness of the board to be cut in setting up the knees, the operator merely throws the arm $b^9$ first over to the right and then back again against the stop $c^2$, thereby causing a partial rotation of the worms B² and B³ and allowing the set-shaft to rotate to the limit for which the pin C had been adjusted.

It will be seen that the two worms B² and B³ form an effective lock upon the set-shaft against its constant tendency to rotate, and this tendency being in one direction all lost motion is avoided, a thing very necessary to the production of even lumber.

The knees may be receded preparatory to loading another log upon the carriage by simply throwing the clutch B× out of engagement with the worm-wheel B⁰ when the spring A⁴ is used upon the set-shaft, the energy stored up in the said spring serving to return the knees to the rear of the carriage; or, if the spring be not used, this may be accomplished by turning backward on the hand-wheel C⁰, the engine being either reversed or pressure shut off therefrom entirely.

Having thus described my invention, what I claim as new, and desire to secure by Letters Patent of the United States, is—

1. In sawmill set-works, the combination with the set-shaft, means for imparting to the said set-shaft a constant tendency to rotate; a sleeve mounted loosely upon the set-shaft, a gear carried by the said sleeve; means for imparting to the said gear and sleeve a constant tendency to rotate; a worm-gear also carried by said sleeve; and means for locking the said sleeve upon the set-shaft; of means for locking the said set-shaft against rotation consisting of a pair of worms engaging opposite sides of the said worm-gear; and manually-operated gearing for rotating said worms, substantially as described.

2. In sawmill set-works, the combination with the set-shaft, a sleeve mounted loosely thereon; a toothed gear carried by said sleeve; means for rotating said gear and sleeve; a worm-gear also carried by the said sleeve; and a clutch for locking the said sleeve upon the set-shaft, of means for locking the said sleeve against rotation consisting of a pair of worms engaging said worm-wheel upon opposite sides; intermeshing gears on the said worm-shafts and manually-operated gearing connected with one of the said worm-shafts, substantially as described.

3. In a sawmill set-works, the combination with the set-shaft, means for imparting to the said set-shaft a constant tendency to rotate; a sleeve mounted loosely upon the set-shaft, a gear carried by the said sleeve; means for imparting to the said gear and sleeve a constant tendency to rotate; a worm-gear also carried by said sleeve; and a clutch on the set-shaft for locking and unlocking said sleeve thereon; of means for locking the said set-shaft against rotation consisting of a pair of worms engaging opposite sides of the said worm-gear; and manually-operated gearing for rotating said worms, substantially as described.

In testimony whereof I affix my signature in presence of two witnesses.

RUBEN F. BARKER.

Witnesses:
M. O. KOHLER,
OSTEN MATHISEN.